Jan. 18, 1938. R. B. COTTRELL 2,105,998
BRAKE BEAM SAFETY GUARD
Filed Aug. 1, 1935
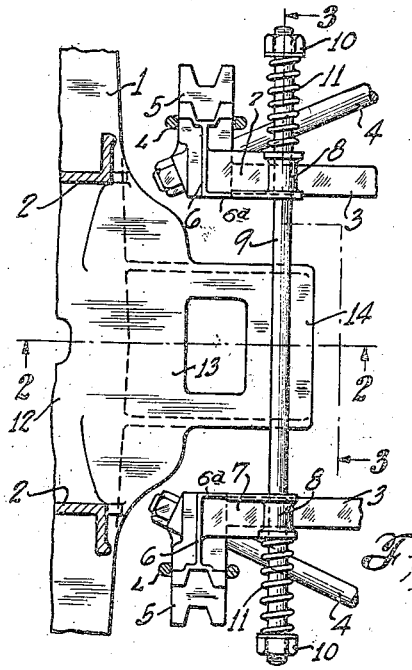
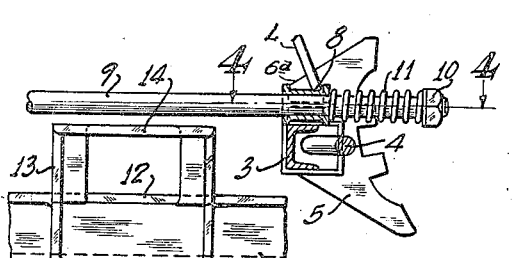
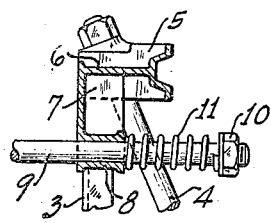
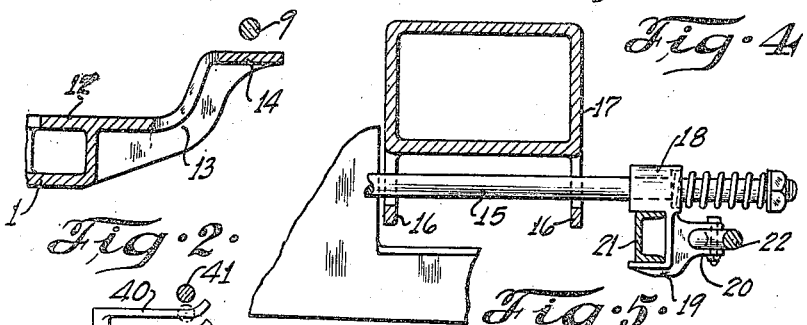
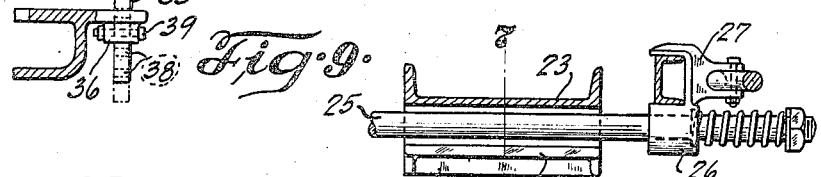
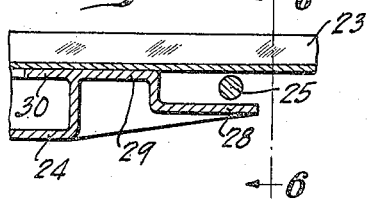
Inventor
Robert B. Cottrell.
By Rodney Bedell
Attorney Patented Jan. 18, 1938

2,105,998

UNITED STATES PATENT OFFICE 2,105,998

BRAKE BEAM SAFETY GUARD

Robert B. Cottrell, Chicago, Ill., assignor to Chicago Railway Equipment Company, Chicago, Ill., a corporation of Illinois Application August 1, 1935, Serial No. 34,129

11 Claims. (Cl. 188—210)

This invention relates particularly to improved safety guards for railway brake beams.

A type of brake beam safety guard previously in use in railway trucks embodies a pair of rods secured to adjacent brake beams near the brake heads and extending between the beams and over the intervening spring plank. The rods are provided with springs which normally urge the beams away from the wheel treads and function as brake releases.

In case of injury to the brake hangers or hanger pins, these rods engage the spring plank and prevent the beams from falling to the track so as to incapacitate the brakes and endanger the train. Obviously this type of safety guard cannot be used in a truck which has no spring plank. Also variations in the relative heights of the brake beams and the spring plank present difficulties.

Brake beam safety guard arms, ledges, and brackets have been provided heretofore on truck side frames, but the special safety guard and release rods referred to above are ordinarily located too far above or too far inwardly from these projections to properly cooperate therewith for safe-guarding the beams.

An object of the present invention is to provide a brake beam safety guard of the above type which is associated directly with and secured to the brake heads instead of the brake beams as has been the case heretofore.

Another object is to provide a brake beam safety guard of the above type which may be utilized in a spring plankless truck.

The above objects and other more detailed objects hereafter appearing are attained by the structures illustrated in the accompanying drawing, in which—

Figure 1 is a top view showing parts of a railway truck embodying the invention, portions of the truck side frame being shown in horizontal section.

Figure 2 is a vertical transverse section on the line 2—2 of Figure 1.

Figure 3 is a vertical longitudinal section on the line 3—3 of Figure 1.

Figure 4 is a detail horizontal section on the line 4—4 of Figure 3.

Figure 5 is a vertical longitudinal section showing a truck bolster and adjacent parts and illustrating a modification.

Figure 6 is a vertical longitudinal section taken on the line 6—6 of Figure 7 and illustrating another modification.

Figure 7 is a vertical transverse section taken on the line 7—7 of Figure 6.

Figure 8 is a view similar to Figure 4 but showing still another modification.

Figure 9 is a section corresponding to Figures 2 and 7 but showing another modification.

Certain features illustrated in the present application are more fully disclosed and claimed in a copending application Serial No. 34,153, filed August 1, 1935 in the name of Edwin G. Busse.

The truck in Figures 1 to 4 includes a side frame, generally indicated at 1, having vertical columns 2 forming an opening therebetween for accommodating the end of the bolster and bolster springs (not shown). Extending transversely of the truck are the brake beam assemblies, suspended from the frame by links L in the usual manner and each including a compression member 3 and tension member 4 forming a truss-type beam, and a brake head 5. Rib 6 on the back of each brake head is slightly deformed at the top as at 6a, and integral with this deformed part is a T-section bracket 7 which, at its inner extremity, has a collar 8 embracing longitudinal rod 9 which is secured to and extends between both beams and parallels the side frame. Compressed between collars 8 and nuts 10 at the ends of rod 9, are coiled springs 11 which function to withdraw brake heads 5 from the wheel treads (not shown) when the braking pressure is released.

Extending inwardly from the truck side frame and forming a continuation of bolster spring seat 12, is a relatively short bracket or ledge 13 which, at its inner extremity, is offset upwardly as at 14 so as to extend immediately beneath longitudinal rod 9. Ledge 13 thus cooperates with rod 9 to safeguard the beam assemblies through brackets 7 and the brake heads. Bracket 13 performs the safeguarding function of spring planks in general use without embodying a heavy piece of material extending clear across the truck and, furthermore, is better adapted for its intended purpose because it can be shaped adjacent to the side frame to cooperate more effectively with rod 9.

In Figure 5, no spring plank or other element projecting from the side frame is provided, and the longitudinal safety guard and release rod 15 extends through vertically slotted brackets 16 depending from the bolster 17. Rod 15 is secured to the brake beam by means of bracket 18 which has parts 19 and 20 embracing the compression and tension members 21 and 22, respectively.

In Figures 6 and 7, a spring plank 23 is provided extending between the side frames, the lower portion of one of which is illustrated at 24. Longitudinal rod 25 extends beneath the beams and has a bracket 26 secured to the compression and tension members thereof as at 27. Rod 25 extends beneath the spring plank and immediately above the downwardly offset inner extremity 28 of ledge 29 extending inwardly from the side frame in line with web 30 supporting the spring plank.

Figure 8 shows a bracket 31 corresponding to bracket 7 in Figures 1 and 4, but formed separately and secured to the brake head 32 by bolts, one of which is shown at 33. The backing rib 34 of head 32 need not be deformed, as shown in Figure 3, in order to permit attachment thereto of bracket 31.

Figure 9 illustrates an adjustable bracket including a leg portion 35 vertically movable in an apertured boss 36 on the inner portion of side frame ledge 37. The bracket leg has a series of holes 38 for receiving a bolt 39 in securing the bracket in the desired adjustment. An arm 40 extends laterally from the leg 35 immediately beneath guard rod 41.

In each of the forms, the longitudinal combination safety guard and release rod is firmly secured to the associated brake beam assemblies and the underlying truck part is positioned to properly cooperate with this rod without affecting the normal operation of the brake beams to and from the wheels and their rise and fall relative to other truck parts due to truck spring compression.

The invention is not limited to the exact details illustrated, but may be modified in various respects as will occur to those skilled in the art, and the exclusive use of all such modifications coming within the scope of the appended claims is contemplated.

What is claimed is:

1. In combination, a railway truck part having an upwardly facing element, a brake beam adjacent said part, a brake head carried by said beam, and a member carried by said head and extending longitudinally of the truck from said head and immediately above said element for safeguarding said beam.

2. In a railway truck, a side frame structure, an element projecting inwardly therefrom, a brake beam assembly including a transverse beam and a brake head, and an elongated member extending longitudinally of the truck adjacent said head and immediately above said projecting element, said head having a bracket secured to said elongated member whereby said member and said element cooperate to safeguard said assembly.

3. The combination of elements specified in claim 2 in which said bracket is an integral part of said head.

4. The combination of elements specified in claim 2 including a second brake beam assembly and spring structure cooperating with said elongated member to release the brakes, said elongated member terminating adjacent said assemblies and being disconnected from all other portions of the truck.

5. In a railway truck, a side frame member having an element projecting therefrom and terminating a short distance inwardly thereof, brake beam assemblies including transverse beams and heads, and an elongated member secured directly to said heads and extending above said projecting element and cooperating therewith to safeguard said beam assemblies.

6. In a railway truck, a side frame structure having an element projecting inwardly therefrom, brake beam assemblies, and an elongated member secured directly to said assemblies and connecting the same, said member extending beneath said assemblies, and said projecting element being offset downwardly and extending immediately beneath said member so as to cooperate therewith in safeguarding said assemblies.

7. The combination of elements specified in claim 6 including a spring plank extending inwardly from said side structure and above said elongated member, said member extending between said spring plank and the downwardly offset portion of said projecting element.

8. A railway brake head having a laterally projecting bracket for attachment of a brake beam safety guard member.

9. In a railway truck, a side frame, a brake beam suspended from said side frame, a brake head carried by said beam, a safety guard member secured to the side of said head facing inwardly of the truck, and means on said side frame for underlying said safety guard member.

10. In a railway truck, a side frame, a brake beam assembly including a brake head, a hanger suspending said head from said frame, a bracket on said head extending laterally thereof beyond said hanger, and a brake beam safety guard member secured to said bracket and extending abreast of said hanger, and a truck part extending beneath said guard member.

11. A railway brake head having a shoe receiving forward portion and a projecting side portion adapted for attachment of a brake beam safety guard member.

ROBERT B. COTTRELL.